C. B. Matthews,
Corn Harvester.
No. 21,840.        Patented. Oct. 19 1858.
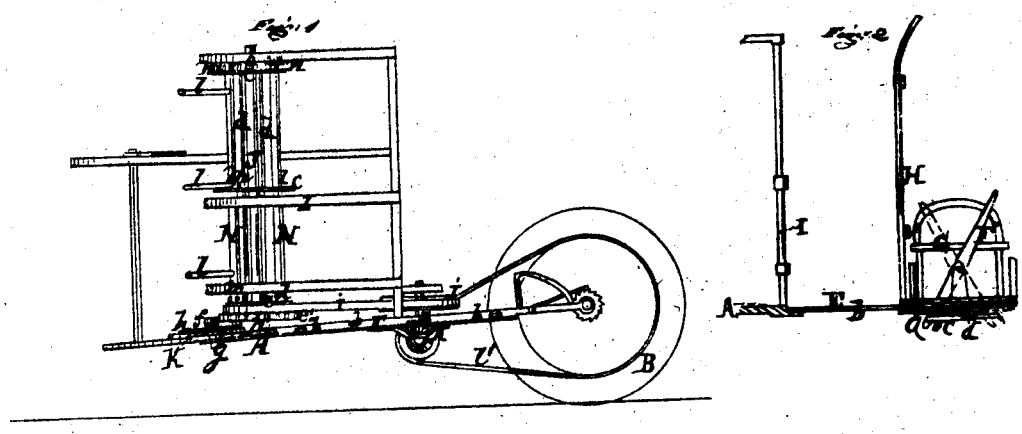
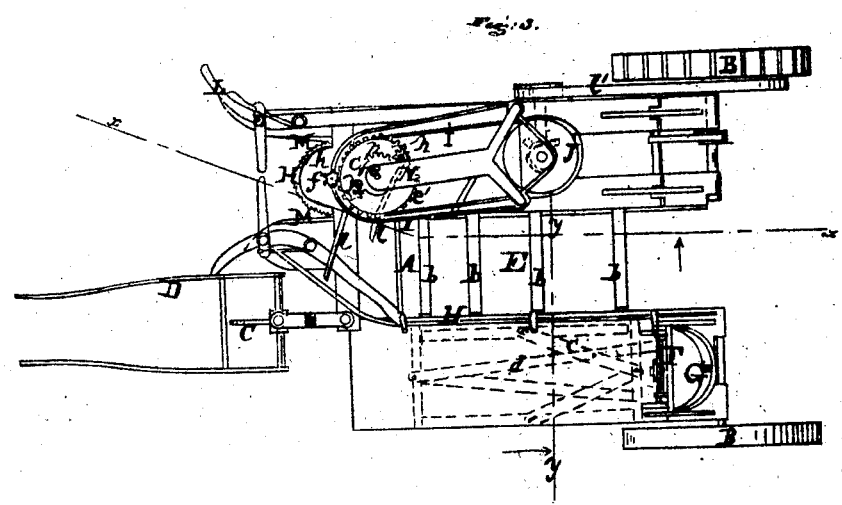

UNITED STATES PATENT OFFICE.

C. B. MATTHEWS, OF OQUAWKA, ILLINOIS.

IMPROVEMENT IN MAIZE-HARVESTERS.

Specification forming part of Letters Patent No. 21,840, dated October 19, 1858.

*To all whom it may concern:*

Be it known that I, C. B. MATTHEWS, of Oquawka, in the county of Henderson and State of Illinois, have invented a new and Improved Indian-Corn or Maize Harvester; and I do hereby declare that the following is a full, clear, and exact description of the same, reference being had to the annexed drawings, making a part of this specification, in which—

Figure 1 is a longitudinal vertical section of my invention, taken in the line $x\ x$, Fig. 3. Fig. 2 is a transverse section of a portion of the same, taken in the line $y\ y$, Fig. 3. Fig. 3 is a plan or top view of the same.

Similar letters of reference indicate corresponding parts in the several figures.

This invention consists in the employment or use of a rotary and stationary cutter, sliding bed, and revolving arms, all attached to a suitable platform mounted on wheels, and arranged as hereinafter fully shown and described, whereby, as the machine is drawn along, standing corn may be cut and deposited in gavels on the ground with great facility and in a rapid and perfect manner.

To enable those skilled in the art to fully understand and construct my invention, I will proceed to describe it.

A represents a platform, which is mounted on three wheels, B B C, the wheels B B supporting the back part of the platform, and the wheel C, which is a swivel-wheel, supporting the front end. To the stock or swivel, in which the wheel C is placed, the thills or shafts D are attached, as shown plainly in Fig. 3. At the center of the platform A there is a rectangular opening, E, which extends nearly the whole length of the platform. To the under side of the platform there is attached a sliding bar, $a$, having slats $b$ secured to it at right angles. The bar $a$ and slats $b$ work in suitable guides, and an upright lever, F, is connected to the bar $a$ by means of two levers, $c\ d$, which are pivoted to the under side of the platform, and arranged as shown clearly by the dotted lines in Fig. 3. The lever F extends upward in front of the driver's seat G, which is placed on the back part of the platform, as shown in Fig. 3, and by moving said lever F the slats $b$ may be extended across the opening E, and also shoved back therefrom underneath the platform, (see Fig. 3, in which the slats are shown in black extending across the opening E, and shown removed therefrom by red dotted lines.)

On the platform A, and at the left side of the opening E, there is placed an upright fence or guard, H, which extends the whole length of the platform, and to the platform A, at the right side of the opening E, there is attached a fence or guard, I, in which a vertical shaft, J, is placed. This shaft J has three circular disks, $c\ c\ c$, attached to it, said disks being connected by rods $d\ d$. The lower end of shaft J is stepped on the platform A and the upper end works in a prop or bearing, $e$.

To the lower disk, $c$, at its under side, a toothed wheel, $e'$, is attached concentrically, and the wheel $e'$ gears into a pinion, $f$, which is placed on the upper end of a spindle, $g$, said spindle having a circular saw, K, on its lower end. The saw K works underneath a semicircular projection, $h$, on the platform, the teeth of the saw extending a trifle beyond the edge of the projection. (See Fig. 3.) Around the lower disk, $c$, a belt, $i$, passes, said belt also passing around a pulley, $j$, which is driven by gearing $k$, and a belt, $l'$, from one of the wheels, B, at the back end of the platform. (See Figs. 1 and 3.) At the right side of the fence or guard I there is an additional fence or guard, L, which projects outward from the platform, and curved to the right, corresponding inversely with the front end of the fence or guard H, (see Fig. 3,) and at the lower ends of the guard-fences H L there are placed knives or cutters M M, one at each side of the saw K.

N N represent two vertical shafts, which pass through the disks $c\ c\ c$ at opposite sides of their shaft J. The shafts N are placed loosely in the disks, and have horizontal curved arms $l$ attached. The shafts N are encompassed by semicircular ledges $m$, attached to the upper surfaces of the two lower disks. To the upper ends of the shafts N pinions $n$ are attached, and just above the shaft J a disk, $o$, is attached, having a few teeth, $p$, at one side of it, as shown clearly in Fig. 3.

To the platform A, underneath the toothed wheel $e'$, an inclined projection, $p'$, is attached. (Shown clearly in Fig. 1.)

The operation is as follows: As the machine is drawn along, a rotary motion is given the saw K by means of the gearing and belts previously described, and the standing stalks are cut by the saw K, aided by the knives or cutters M M. The shaft J and disks c c c are rotated, and also the shafts N, by the belt i, and as the pinions n of the shafts N pass the teeth p of the disk o the shafts N N are rotated partially, or to a certain extent, so that the arms l will sweep around and across the space between the guards H L and throw the stalks cut by the saw and cutters on the slats b, which are allowed to extend across the opening E to receive the stalks. As the arms l pass around, and after they have performed the above work, the inclined projection p' raises the shafts, so that their arms may pass over the ends of the ledges m and elevate the shafts N, so that the pinions n may gear into the teeth p of the disk o, it being understood that the shafts N fall a certain distance as soon as the arms pass off the ledges m, in order to allow the arms to be thrown back for a succeeding sweep. When a sufficient quantity of cut stalks have been deposited on the slats to form a gavel the driver from seat G actuates the lever F and throws back the slots b, so that the gavel will fall on the ground, the slats being immediately extended over the opening E to receive a succeeding gavel.

I am aware that saws and stationary cutters have been previously used for harvesting corn or maize; and I am also aware that arms have been used to gather the cut stalks and eject them from the machine—as shown, for instance, in the harvester of J. V. Adair, patented April 6, 1858. I do not claim therefore the circular saw K, nor the stationary cutters M M; nor do I claim, separately and irrespective of arrangement, arms for throwing the stalks on the platform; but,

Having thus described my invention, what I claim as new, and desire to secure by Letters Patent, is—

1. The saw K and stationary cutters M M, in combination with the revolving arms l, attached to shafts N N, when the several parts are arranged to operate as and for the purpose herein set forth.

2. In combination with the above, the sliding bars or slats b, connected with the lever F, and arranged with the opening E in the platform A, as and for the purpose described.

C. B. MATTHEWS.

Witnesses:
S. W. MORGAN,
M. A. FRAZELL.